(12) United States Patent
Serbanescu et al.

(10) Patent No.: US 9,506,764 B2
(45) Date of Patent: Nov. 29, 2016

(54) SYSTEM AND METHOD OF GENERATING A ROUTE ACROSS AN ELECTRONIC MAP

(71) Applicants: TomTom International B.V., Amsterdam (NL); TomTom Development Germany GmbH, Leipzig (DE)

(72) Inventors: Alexandru Serbanescu, Amstelveen (NL); Heiko Schilling, Nottingham (GB); Ewgenij Gawrilow, Berlin (DE); Moritz Hilger, Berlin (DE); Andreas Profous, Berlin (DE); Jürgen Werber, Berlin (DE)

(73) Assignee: TomTom Navigation B.V., Amsterdam (NL)

( * ) Notice: Subject to any disclaimer, the term of this patent is extended or adjusted under 35 U.S.C. 154(b) by 45 days.

(21) Appl. No.: 13/656,894

(22) Filed: Oct. 22, 2012

(65) Prior Publication Data

US 2013/0046465 A1 Feb. 21, 2013

Related U.S. Application Data

(63) Continuation of application No. PCT/EP2011/053565, filed on Mar. 9, 2011.

(60) Provisional application No. 61/326,278, filed on Apr. 21, 2010.

(51) Int. Cl.
*G01C 21/34* (2006.01)
*G08G 1/0968* (2006.01)

(52) U.S. Cl.
CPC ......... *G01C 21/34* (2013.01); *G08G 1/096827* (2013.01)

(58) Field of Classification Search
CPC .. G01C 21/00; G01C 21/3492; G01C 21/34; G01C 21/3446; G01C 21/3691; G01C 21/26; G01S 21/00; G01S 19/09; G01S 19/41
USPC .............. 701/117, 118, 413, 414, 423, 489
See application file for complete search history.

(56) References Cited

U.S. PATENT DOCUMENTS

| 5,428,396 A | 6/1995 | Yagasaki et al. |
| 6,084,908 A | 7/2000 | Chiang et al. |

(Continued)

FOREIGN PATENT DOCUMENTS

| CN | 1715835 A | 1/2006 |
| CN | 1991312 A | 7/2007 |

(Continued)

OTHER PUBLICATIONS

International Search Report issued Jul. 4, 2011 for International Application No. PCT/EP2011/053565.

*Primary Examiner* — Truc M Do

(57) ABSTRACT

A computerized method of generating a route 1000 from an origin position F1 to a destination position 706 across an electronic map 700 comprising a plurality of vectors representing segments of a navigable route in the area covered by the electronic map 700, the method comprising: (1) obtaining delay data indicating delays on vectors within the area covered by the electronic map 700; (2) calculating a first portion 1002 of a route from origin position toward the destination position 706 using a first routing method up to a predetermined threshold 1006 from the origin position F1, such that the first routing method uses the delay data so that the first portion 1002 of the route takes into account delays; and (3) calculating a second portion 1004 of the route beyond the predetermined threshold 1006 to the destination position 706 using a second routing method to further calculate the route to the destination position 1006.

21 Claims, 11 Drawing Sheets

(56) References Cited

U.S. PATENT DOCUMENTS

| | | |
|---|---|---|
| 6,434,275 B1 | 8/2002 | Fukuda et al. |
| 6,636,800 B1 | 10/2003 | Lauther et al. |
| 7,206,448 B2 | 4/2007 | Howard |
| 7,451,005 B2 | 11/2008 | Hoffberg et al. |
| 7,454,071 B2 | 11/2008 | Howard |
| 7,711,046 B2 | 5/2010 | Ebara et al. |
| 7,783,420 B2 | 8/2010 | Oonishi et al. |
| 8,086,403 B2 | 12/2011 | Ishikawa |
| 8,472,729 B2 | 6/2013 | Howard |
| 2001/0047241 A1* | 11/2001 | Khavakh et al. ............ 701/209 |
| 2002/0128772 A1* | 9/2002 | Polidi et al. ................. 701/208 |
| 2003/0028319 A1* | 2/2003 | Khavakh et al. ............ 701/209 |
| 2003/0161405 A1 | 8/2003 | Howard |
| 2004/0039523 A1* | 2/2004 | Kainuma et al. ............. 701/208 |
| 2005/0096842 A1 | 5/2005 | Tashiro |
| 2005/0137791 A1* | 6/2005 | Agrawala et al. ............ 701/209 |
| 2005/0157884 A1 | 7/2005 | Eguchi |
| 2005/0187702 A1 | 8/2005 | Yoshikawa et al. |
| 2005/0222764 A1 | 10/2005 | Uyeki et al. |
| 2005/0243918 A1 | 11/2005 | Ebara et al. |
| 2006/0004511 A1 | 1/2006 | Yoshikawa et al. |
| 2006/0158330 A1* | 7/2006 | Gueziec .................. 340/539.13 |
| 2006/0178807 A1* | 8/2006 | Kato et al. .................... 701/117 |
| 2006/0178819 A1* | 8/2006 | Couckuyt et al. ............. 701/209 |
| 2006/0184319 A1* | 8/2006 | Seick et al. ................... 701/209 |
| 2006/0200258 A1 | 9/2006 | Hoffberg et al. |
| 2007/0038362 A1* | 2/2007 | Gueziec ....................... 701/117 |
| 2007/0073480 A1* | 3/2007 | Singh ............................ 701/211 |
| 2007/0154090 A1 | 7/2007 | Howard |
| 2008/0228389 A1 | 9/2008 | Kano et al. |
| 2009/0005977 A1 | 1/2009 | Chung et al. |
| 2009/0041128 A1 | 2/2009 | Howard |
| 2011/0040438 A1* | 2/2011 | Kluge et al. .................... 701/29 |
| 2011/0224901 A1 | 9/2011 | Aben et al. |
| 2011/0288762 A1* | 11/2011 | Kuznetsov .................... 701/200 |
| 2012/0158299 A1* | 6/2012 | Cerecke et al. .............. 701/533 |
| 2012/0239281 A1* | 9/2012 | Hinz ............................ 701/117 |
| 2012/0290202 A1* | 11/2012 | Gueziec ....................... 701/423 |
| 2013/0033385 A1* | 2/2013 | Gueziec ....................... 340/905 |

FOREIGN PATENT DOCUMENTS

| | | |
|---|---|---|
| CN | 101246021 A | 8/2008 |
| CN | 101325004 A | 12/2008 |
| EP | 1566611 A1 | 8/2005 |
| EP | 1640936 A1 | 3/2006 |
| EP | 1944577 A2 | 7/2008 |
| JP | H0546087 A | 2/1993 |
| JP | H0935183 A | 2/1997 |
| JP | 2000283776 A | 10/2000 |
| JP | 2002310702 A | 10/2002 |
| JP | 2003021524 A | 1/2003 |
| JP | 2005233814 A | 9/2005 |
| JP | 2007040912 A | 2/2007 |
| JP | 2007087287 A | 5/2007 |
| JP | 2007139794 A | 6/2007 |
| JP | 2007218770 A | 8/2007 |
| JP | 2007218777 A | 8/2007 |
| JP | 2008020414 A | 1/2008 |
| JP | 2008224547 A | 9/2008 |
| JP | 2009036618 A | 2/2009 |
| JP | 2009122856 A | 6/2009 |
| JP | 2012505449 A | 3/2012 |
| WO | 9922205 A1 | 5/1999 |
| WO | 2010040404 A1 | 4/2010 |
| WO | 2011004026 A2 | 1/2011 |
| WO | 2011004029 A2 | 1/2011 |

* cited by examiner

| From Node ID | To Node ID | Search acceleration data (One bit per destination region) |
|---|---|---|
| 3370 | 116998 | 0000000000000000000000000000000*000000000000000000000000 |
| 3370 | 875136 | 1111111111111111111111111111111*111111111111111111111111 |
| 3370 | 875140 | 0000000000000000000000000000000*000000000000000000000000 |
| 3371 | 242702 | 0000000000000000000000000000000*000000000000000000000000 |
| 3372 | 236908 | 1101001101*1001000000010000110100000000010000100000 |
| 3372 | 236959 | 0111111111*11111111111111111110111111111111111111 |
| 3372 | 236962 | 0000000000*0001000000000000000000000000100000000 |
| 3373 | 467023 | 0000000000000000000000000000000*000000000000000000000000 |
| 3373 | 239074 | 11111111111111111111111*111111111111111111111111 |
| 3373 | 466974 | 0000000000010000000000000000000*000000000000000000000000 |
| 3374 | 109621 | 0000000000*11111111110111111111111111 |
| 3374 | 867389 | 0000000000*000000000000000000010000000000000000000 |
| 3374 | 867437 | 1101001101*1001000000010000110100010000 |
| 3375 | 238720 | 1111111111*1111111111111111 111111111111111111 |
| 3375 | 460178 | 0000000000*000000000000000000000000000000000000 |
| 3375 | 460179 | 0000000000*000000000000000000000000000000000000 |

*── From Region ID

SYSTEM AND METHOD OF GENERATING A ROUTE ACROSS AN ELECTRONIC MAP

CROSS-REFERENCES TO RELATED APPLICATIONS

This application is a continuation of International Application No. PCT/EP2011/053565 filed Mar. 9, 2011, and designating the United States, and which claims priority from U.S. Provisional Application No. 61/326,278 filed Apr. 21, 2010. The entire contents of both applications are incorporated herein by reference.

FIELD OF THE INVENTION

The present invention relates to a computerised method of generating a route and associated systems. Typically, the route is generated across an electronic map from an origin position to a destination position. Further, typically the method and systems will generate route data. The method may particularly find use, but not exclusively, in a navigation device and in particular a Portable Navigation Device (PND).

BACKGROUND OF THE INVENTION

Route planning devices (often referred to as Satellite Nav.'s, Portable Navigation Devices (PND's) or similar) together with web sites accessible across the World Wide Web (WWW) such as http://routes.tomtom.com/ are well known and allow a user thereof to plan a route between two points. Such technology may be referred to generically as electronic route planning or just route planning.

Map data (ie electronic maps) for such electronic route planning comes from specialist map vendors such as Tele Atlas NV. When performed on a PND such route planning typically uses position data from a GPS system. However, other applications may allow a user to input his/her location or other point to be considered for routing planning purposes.

Such map data comprises a plurality of roads (and other navigable paths) which can be described as lines—i.e. vectors or road segments (e.g. start point, end point, direction for a road, with an entire road being made up of many hundreds of such segments, each uniquely defined by start point/end point direction parameters). Such vectors connect nodes which represent intersections between vectors and typically represent a junction in the road represented by the vector.

An electronic map is then a set of such road vectors, nodes, data associated with each vector and node (speed limit; travel direction, etc.) plus points of interest (POIs), plus road names, plus other geographic features like park boundaries, river boundaries, etc., all of which are defined in terms of vectors. All map features (e.g. road vectors, POIs etc.) are typically defined in a co-ordinate system that corresponds with or relates to the GPS co-ordinate system, enabling a device's position as determined through a GPS system to be located onto the relevant road shown in an electronic map and for a route, which aims to be optimal minimising a selected cost function, to be planned to a destination.

The data providing such electronic maps can be extensive. It is known for electronic maps to cover areas having in excess of 120,000,000 vectors and an example of such map data would be a map covering the area of Europe and Russia. As such, planning a route using such map data is complex and can be time consuming. Also, it is known that such route planning is a trade-off between accuracy and time.

Prior art which has considered ideas at improving the speed at which routing can occur includes U.S. Pat. No. 6,636,800 which discusses refinements to the A* best-first search strategy suitable for much smaller map sizes such as the highway road network of Western Europe (having roughly 400,000 vectors).

SUMMARY OF THE INVENTION

According to a first aspect of the invention there is provided a computerised method of generating a route from an origin position to a destination position across an electronic map comprising a plurality of vectors representing segments of a navigable route in the area covered by the electronic map, the method comprising:
1) obtaining delay data indicating delays on vectors within an area covered by the electronic map;
2) calculating a first portion of a route, from an origin position toward the destination position, using a first routing method up to a predetermined threshold from the origin position, such that the first routing method uses the delay data so that the first portion of the route takes into account delays; and
3) calculating a second portion of the route beyond the predetermined threshold to the destination position using a second routing method to further calculate the route to the destination position.

Such a method is believed advantageous as it takes into consideration delays around the vehicle and as such may provide more accurate routes typically producing routes which route around traffic delays. However, the method should also reduce the time taken to generate a route, when run on the same hardware, when compared to prior art routing techniques which take into account delay data.

Typically, the delay data will indicate delays caused by traffic incidents, such as accidents or the like. Such data may be thought of as delay data. However, the delay data will typically include data on delays whatever the cause. The skilled person will appreciate that delays may be caused by any number of reasons, such as road closures; weather; events such as concerts, fayres, etc.; sporting events; road works; or the like.

It is known to allow users' of electronic maps to note and subsequently upload to the map provider errors within the electronic map. As such, the accuracy of the electronic map may be improved through the actions of the community of users. TomTom™ provides such a system under the trade mark Map Share™. As such, users of such electronic maps can choose to utilise errors which have been notified by the community of users and such errors, or rather fixes to the errors, are downloadable and subsequently useable with the electronic map. In the context of this aspect of the invention the delay data may also include fixes to errors within the electronic map across which the route is being generated.

The method may generate route data as an output thereof. The route data may provide details of the route across the electronic map.

It is known that traffic incidents typically have a finite life-span of a few tens of minutes. Research has indicated that in a very large majority of the cases the life span of a traffic incident may not exceed 30 minutes. As such, considering traffic incidents beyond the distance that can be driven in the life span of a traffic incident may be unwarranted since the traffic incident may have dispersed by the time that a driver arrives at the location of the traffic incident.

Accordingly, the method may set the predetermined threshold for which the first routing method is used as the distance that can be traveled within a predetermined driving time. The predetermined driving time may be selected to be roughly 40 minutes. Alternatively, the predetermined driving time may be roughly any of the following number of minutes: 15, 20, 25, 30, 35, 45, 50, 60 or more. In setting the predetermined threshold the method may consider the expected driving speed that can be expected at that time; ie the predetermined threshold is set at a distance from the origin position that can be expected to be reached in the actual driving conditions (ie at an actual expected driving speed). The expected driving speed that can be expected at that time may be thought of as first driving speed.

The predetermined threshold may be varied according to the area to which the electronic map relates. For example, the predetermined threshold may be varied according to the country, whether the area is urban, rural or the like, etc.

Embodiments of the invention may limit the delay data that is considered to an area surrounding the origin position. Such a method is convenient since it reduces the amount of data that is considered which brings about advantages in relation to storage of that data, reduction in bandwidth, faster processing, etc.

The area surrounding the origin position may be a shape that can be tessellated, such as a rectangle, square or the like. Such a shape is advantageous since it can make intersection with traffic incidents of some embodiments of the invention simpler.

Before determining the shape that can be tessellated, the method may determine an alternative shape such as an ellipse, circle or the like.

Should an ellipse be used then it may have the origin position as one of the focuses of the ellipse. The method may subsequently fit the shape that can be tessellated around the ellipse.

The method may set the area surrounding the origin position based upon the distance that can be driven in a predetermined time which may be thought of as a second driving speed. The method may use a set speed to make this determination, which may be the speed that a driver could be expected to drive given a clear road. That is the method may set the size of the area based upon, what may be thought of as, best-case driving conditions.

Therefore, some embodiments may use an actual expected driving speed to determine the predetermined threshold at which the method switches from the first routing method to the second routing method whereas they might use a best case scenario driving speed to determine the area surrounding the origin over which delay data is considered. Such embodiments are convenient since the predetermine threshold should always be within the area for which delay data is available, but the method has significantly reduced the amount of delay data that is considered.

As discussed above, the first driving speed is typically less than or equal to the second driving speed. In some embodiments, the first driving speed is the driving speed that can be expected given the current driving conditions and the second driving speed is the driving speed that can be expected given clear driving conditions.

The predetermined driving time may be selected to be roughly 40 minutes. Alternatively, the predetermined driving time may be roughly any of the following number of minutes: 15, 20, 25, 30, 35, 45, 50, 60 or more. Embodiments of the invention may advantageously use the smallest value that covers the life-span of almost all traffic incidents or large majority of them since setting the predetermined threshold to too high a value may typically reduce, and possible negate, the advantages of the method and mean that a greater amount of traffic data than is necessary is processed.

The method may use a boundary of a predetermined shape to determine the predetermined threshold. The predetermined shape may be an ellipse. Should an ellipse be used then it may be arranged such that the origin position, which may be a current position of a vehicle, is at a first focus of the ellipse. The method may arrange the dimensions of the ellipse such that the distance from the first focus, through the second focus, to the boundary of the ellipse is equal in distance to the distance that a vehicle could travel in the predetermined driving time. Embodiments, using of an ellipse are believed advantageous since an ellipse provides a boundary which conveniently represents vectors that should be considered for traffic consideration; more focus may be given ahead of the origin position than to the sides where a routes is less likely to be generated.

Subsequently to generating the ellipse, the method may fit a shape that can be tessellated, such as a rectangle around the ellipse. Other shapes may be possible, such as a square, or the like.

The method may form shapes that can be tessellated, for example rectangles, around areas covered by traffic incidents and subsequently, the method may determine whether a rectangle around a traffic incident intersects the area around the origin position for which delay data is considered. The method may utilise delay data relating to any incident in which an intersection occurs. Such a method is convenient in determining whether delay data should be considered.

The method may represent the electronic map as a Directed Acyclic Graph (DAG). Further, the method may use a search method to explore the electronic map and calculate the first portion of the route. The search method may be a best-first search method, such as the A* method. In alternative embodiments, the search method may a method such as Dijkstra's method, or the A1 or A2 methods which preceded the A* method. The A* method is currently believed to be the preferred method of calculating the first portion of the route as it is believed to provide the optimal solution to the determining the lowest cost route between an origin position and a destination position and as such can be used to calculate the route whilst taking into consideration the delay data.

The method may use routing acceleration data to calculate the second portion of the route. Typically the routing acceleration data is associated with the electronic map across which the route is being generated and may indicate which vectors of the electronic map may form part of the lowest cost route to other portions of the electronic map. One example of such routing acceleration data is described in detail in patent application PCT/EP2010/059947 in the name of TomTom International BV (WO 2011/004029) and the content thereof is hereby incorporated by reference. An advantage of using such routing acceleration data is the route can be generated in significantly less time since the routing acceleration data specifies which vectors form part of the lowest cost route according to a pre-determined cost function. However, because the routing acceleration data is pre-generated it does not take into account varying information such as traffic incidents which alter the cost function (typically driving time) for a given vector. It is believed that it is acceptable not to use delay data beyond the predetermined threshold since traffic incidents will have a reduced impact at this distance from the origin position.

Some embodiments of the invention may re-calculate the route if parameters used to generate the original route should change. For example, any of the following may change: delay data; vehicle deviates from the generated route; user alters parameters used to generate route (for example user may indicate that motorways should no longer be used when the generated route used motorways); the traffic configuration change around the route; a user experiences delay along the route (typically caused by slower than expected driving, etc.) or the like.

According to a second aspect of the invention there is provided a navigation device which is arranged to generate a route from an origin position to a destination position across an electronic map accessible thereby and comprising a plurality of vectors representing segments of a navigable route in the area covered by the electronic map wherein the device is arranged to:

1) obtain delay data indicating delays on vectors within an area covered by the electronic map;
2) calculate a first portion of a route from an origin position toward the destination position using a first routing method up to a predetermined threshold from the origin position wherein the first routing method uses the delay data so that the first portion of the route takes into account delays identified by the delay data; and
3) calculate a second portion of the route beyond the predetermined threshold to the destination position using a second routing method to further calculate the route to the destination position.

The navigation device may be a Portable Navigation Device (PND). However, the navigation device may also be any other device which is arranged to process an electronic map and generate a route across that electronic map. For instance the navigation may be any of the following: a telephone; a PDA (Personal Digital Assistant); a tablet computer, such as an iPad™; a server accessible across a network, such as a Wide Area Network (WAN) exemplified by the Internet; a notebook computer; a netbook computer; a PC and/or MAC; a television; a games console; or the like.

According to a third aspect of the invention there is provided a system arranged to generate a route from an origin position to a destination position across an electronic map comprising a plurality of vectors representing segments of a navigable route in the area covered by the electronic map, wherein the system comprises:

at least one server arranged to generate delay data indicating delays on vectors within an area covered by the electronic map; and
at least one navigation device arranged to receive the delay data and to:
1) calculate a first portion of a route from the origin position toward the destination position using a first routing method up to a predetermined threshold from the origin position wherein the first routing method uses the delay data so that the first portion of the route takes into account delays identified by the delay data; and
2) calculate a second portion of the route beyond the predetermined threshold to the destination position using a second routing method to further calculate the route to the destination position.

According to a fourth aspect of the invention there is provided a machine readable medium containing instructions which when read onto at least one machine cause that machine to perform the method of the first aspect of the invention.

According to a fifth aspect of the invention there is provided a machine readable medium containing instructions which when read onto at least one machine cause that machine to perform as the navigation device of the second aspect of the invention.

According to a sixth aspect of the invention there is provided a machine readable medium containing instructions which when read onto at least one machine cause that machine to perform as at least part of the system of the third aspect of the invention.

Any feature described in relation to one aspect of the invention may be used, mutatis mutandis with any other aspect of the invention.

In any of the above aspects of the invention the machine readable medium may comprise any of the following: a floppy disk, a CD ROM, a DVD ROM/RAM (including a −R/−RW and +R/+RW), a hard drive, a memory (including a USB memory key, an SD card, a Memorystick™, a compact flash card, or the like), a tape, any other form of magneto optical storage, a transmitted signal (including an Internet download, an FTP transfer, etc), a wire, or any other suitable medium.

The skilled person will appreciate that embodiments of the invention may be provided in software, firmware, hardware or any combination thereof.

BRIEF DESCRIPTION OF THE DRAWINGS

There now follows by way of example only a detailed description of an embodiment of the present invention with reference to the accompanying drawings in which:

FIG. 6 shows an example of routing acceleration data utilised by some embodiments of the invention described herein;

DETAILED DESCRIPTION OF THE DRAWINGS

Figure 1:
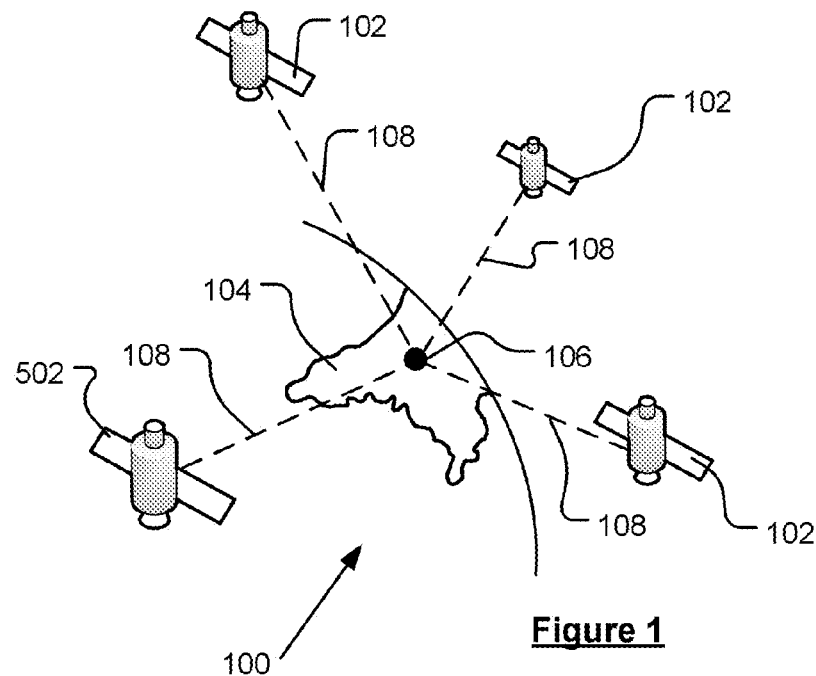
FIG. 1 is a schematic illustration of an exemplary part of a Global Positioning System (GPS) usable by a navigation device.

FIG. 1 schematically shows a Global Positioning System (GPS) which is a satellite-radio based navigation system which may be utilised to determine continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position. The GPS receiver 106 then generates position data which provides the derived co-ordinate information.

Thus, a GPS system allows a user of a device having a GPS receiver 106 to determine his/her position on the planet earth to within a few meters. In order to make use of this information it has become common practice to rely on electronic maps which allow the user's position, provided by the position data, to be shown thereon. Such electronic maps are exemplified by providers such as TeleAtlas (http://www.teleatlas.com). The skilled person will appreciate that the position data need to not be generated from a GPS system and that other sources, or combination of sources, are equally possible.

Such position data could, for example, be derived from position data derived from mobile phone operation, data received at toll barriers, data obtained from induction loops embedded in roads, data obtained from number plate recognition system, data obtained from accelerometers, or the like, associated with a vehicle or any other suitable data source (or combinations of data sources).

Not only do such electronic maps allow a user's position to be shown thereon using a GPS system (or by other means) but they allow a user to plan routes for journeys and the like (routing purposes). In order for this route planning to occur, the electronic map is processed by a navigation device, which may be provided by a general computing device.

Specific examples of such navigation devices include Satellite navigation devices (Sat. Nav) which are convenient to refer to as Portable Navigation Devices (PNDs). It should be remembered, however, that the teachings of embodiments of the present invention are not limited to PNDs but are instead universally applicable to any type of processing device that is configured to process electronic maps, generally so as to provide route planning and navigation functionality. It follows therefore that in the context of embodiments of the present invention, a navigation device is intended to include (without limitation) any type of route planning and navigation device, irrespective of whether that device is embodied as a PND, a vehicle such as an automobile, a portable computing resource, for example a portable personal computer (PC), a mobile telephone or a Personal Digital Assistant (PDA) executing route planning and navigation software or a server, or other computing device, providing such functionality across a network.

Figure 2:
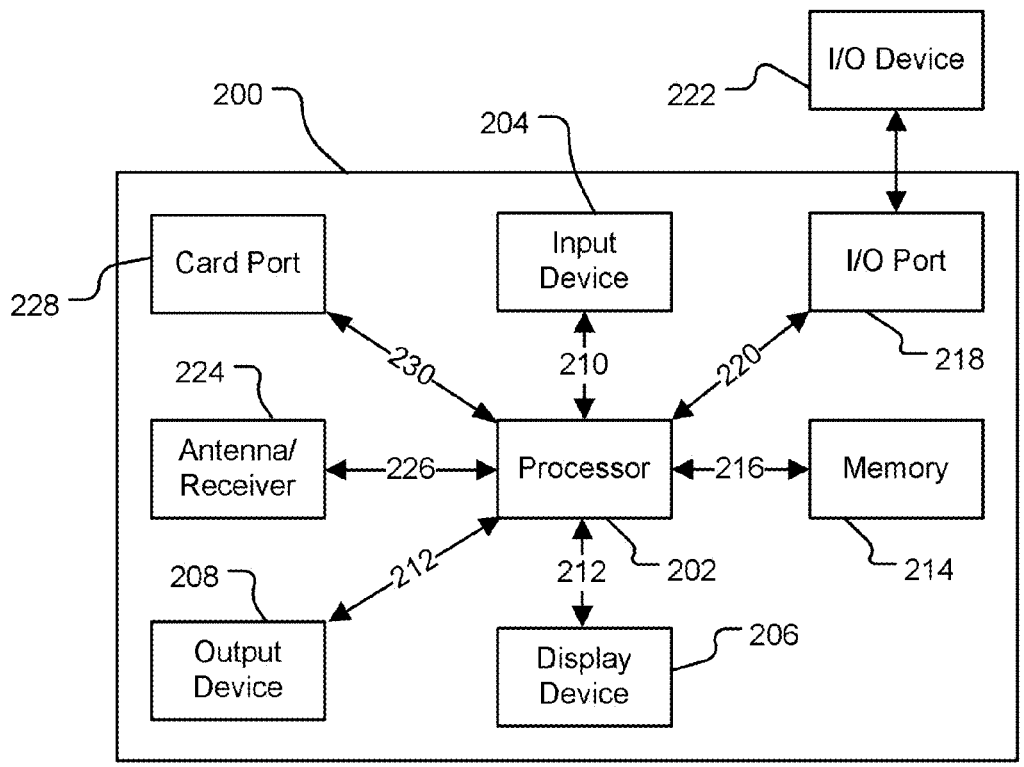
FIG. 2 is a schematic illustration of electronic components of a Portable Navigation Device (PND) or any other suitable navigation device.

An example of such a navigation device in the form of a PND is shown in FIG. 2 and it should be noted that the block diagram of the navigation device is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks™, xD memory cards, USB (Universal Serial Bus) Flash drives, MMC (MultiMedia) cards, SmartMedia cards, Microdrives, or the like).

FIG. 2 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

Figure 3:
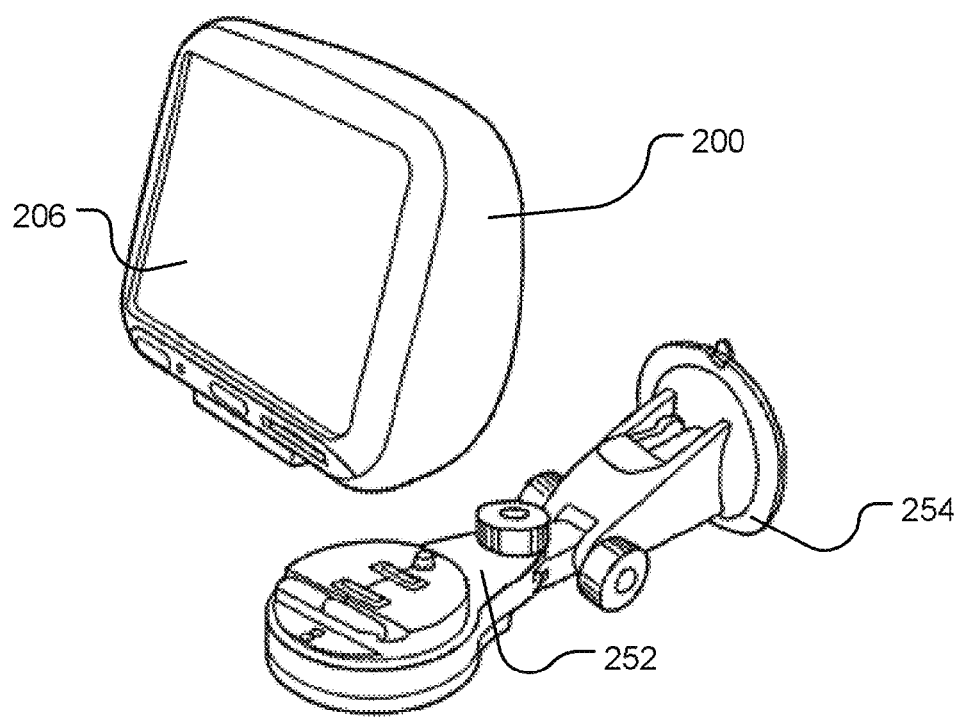
FIG. 3 is a schematic diagram of an arrangement of mounting and/or docking a navigation device.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Referring to FIG. 3, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 4:
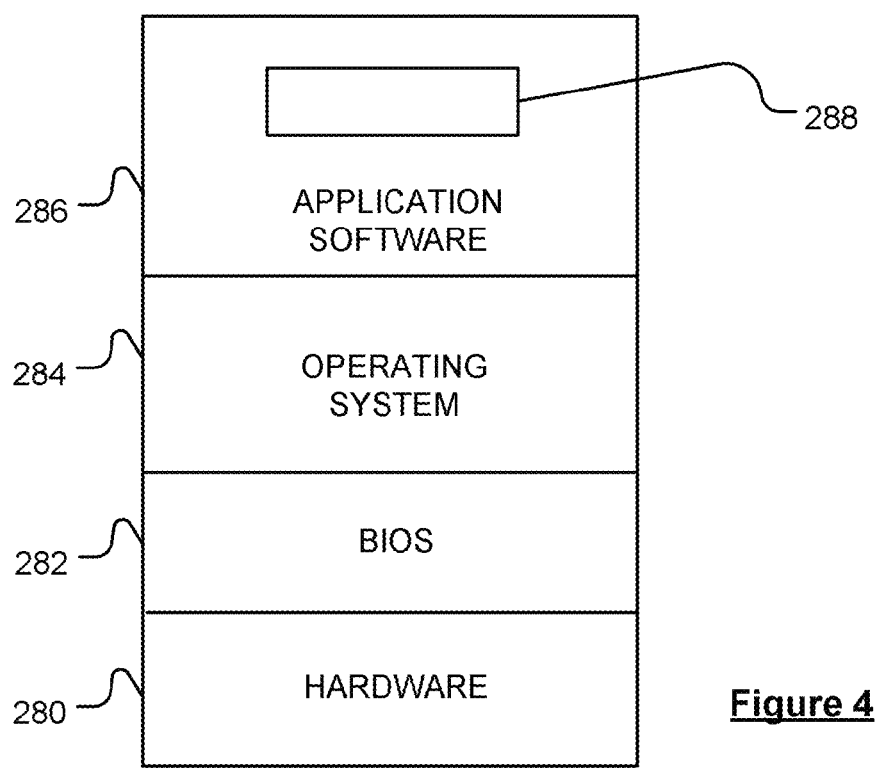
FIG. 4 is a schematic representation of an architectural stack employed by the navigation device of FIG. 2.

Turning to FIG. 4, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the described route planning and navigation functionality) can run. The application software 286 provides an operational environment including the Graphical User Interface (GUI) that supports core functions of the navigation device, for example map viewing, route planning, navigation functions and any other functions associated therewith. In this respect, part of the application software 286 comprises a view generation module 288.

In the embodiment being described, the processor 202 of the navigation device is programmed to receive GPS data received by the antenna 224 and, from time to time, to store that GPS data, together with a time stamp of when the GPS data was received, within the memory 214 to build up a series of positions of the navigation device; ie position data. Each data record so-stored may be thought of as a GPS fix; ie it is a fix of the location of the navigation device and comprises a latitude, a longitude, a time stamp and an accuracy report.

Electronic maps typically cover a geographic area and comprise data which is specially designed to be used by route guidance algorithms, typically using position data derived from the GPS system. For example, roads can be described as lines—i.e. vectors (e.g. start point, end point, direction for a road, with an entire road being made up of many hundreds of such vectors, each uniquely defined by start point/end point direction parameters), with nodes occurring between such vectors. An electronic map is then a set of such road vectors (ie a plurality of vectors), data associated with each vector (speed limit; travel direction, etc.) plus points of interest (POIs), plus road names, plus other geographic features like park boundaries, river boundaries, etc., all of which are defined in terms of vectors. Electronic map features (e.g. road vectors, POIs etc.) are typically defined in a co-ordinate system that corresponds with or relates to the GPS co-ordinate system, enabling a device's position as determined through a GPS system to be located onto the relevant road shown in an electronic map and for an optimal route to be planned to a destination.

There are well know routing methods which allow a route be planned across an electronic map and which can be used by a user to move between at least two positions (an origin position and a destination position). Such algorithms include Dijkstra's method and the refinement thereto, the A* method. These will be well known to the skilled person.

The skilled person will appreciate that wide applicability of routing methods which are commonly used in navigation devices. However, whilst methods such as A* calculate a route across an electronic map they may be slower than is desired. As such, what may be thought of as, routing acceleration data may be added to the electronic map, or at least to electronic files which can be utilised in association with the electronic map. One example of such routing acceleration data is described in detail in patent application PCT/EP2010/059947 in the name of TomTom International BV (WO 2011/0040291) and the content thereof is hereby incorporated by reference.

Figure 5:
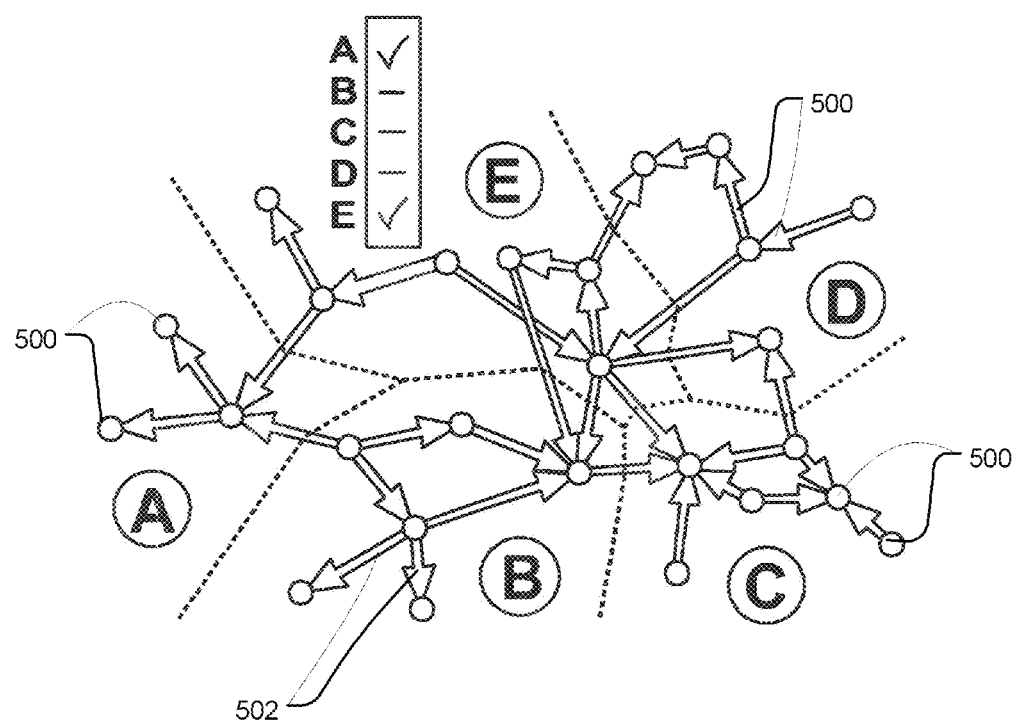
FIG. 5 shows an embodiment of a method of creating routing acceleration data.

However, for ease of reference, the method outlined in PCT/EP2010/059947 is briefly described with reference to FIG. 5. In order to generate the routing acceleration data the electronic map is pre-processed. Typically the pre-processing is performed before the data providing the electronic map is used regardless of whether the map data is to be used on a web site or on a device such as a PND. As such, the pre-processing step is often referred to as a server side process.

Because the pre-processing is performed for a specific electronic map the routing acceleration data that is generated is typically useable only for that electronic map. The skilled person will appreciate that if the routing acceleration data is used for a wholly different electronic map then the routes that are generated will not be the lowest cost route. Moreover, the skilled person will appreciate that different versions of an electronic map will exist as the physical environment which is recorded within the electronic map changes over time. As such, new versions are created to reflect the changing environment and also to make corrections to earlier versions of the electronic map. As such, if the routing acceleration data is used for a version of the electronic map other than the one for which the routing acceleration data was generated then it is likely that routes will stop being the lowest cost routes.

The pre-processing divides nodes 500 of the electronic map (i.e. the intersections between vectors or in other words nodes are connected by vectors) between a plurality of regions and as such, any electronic map is divided into a known number of regions—for example N. The regions (of number N), are shown by the dotted lines in FIG. 5, are created each of which contain a plurality of nodes 500. It will be seen that, in the Figure, there are five regions shown: A, B, C, D and E. Thus it will be seen that region A contains three nodes 500, region B six nodes 500; region C six nodes 500; region D five nodes 500; and region E six nodes. A typical electronic map would of course contain many more regions, nodes 500 and vectors.

As a next pre-processing step, each road segment (ie vector) within a region (eg 502) is processed to determine whether it is part of a least cost route to each of the number of regions (N) within the electronic map and a bit vector is generated (the least cost assessment). Thus, the bit vector, for each road segment 502 within a region A-E, comprises a bit for each navigable segment within a region. That is the bit vector comprises N−1 bits (1 for each region less the region in question) which are either set to 0 or 1 depending on whether that route forms part of the shortest route to the region represented by the bit. Some embodiments, may add additional bits to provide further information such as headers, and the like.

The skilled person will appreciate that in this sense the least cost route can be determined against a number of different cost criteria. For example the least cost may be judged against any of the following criterion: shortest distance; shortest travel time; least expensive (in terms of environmental impact); least petrol used; least $CO_2$ generated, etc. In the current embodiment the least cost is judged against the shortest travel time.

An example of how some embodiments of the invention may store the routing acceleration data is shown in FIG. 6. Each row of FIG. 6 comprises a bit vector which has been generated for a vector (ie road segment) and it will be seen that each bit vector comprises three columns: a leftmost column 600 containing an identity number for the node at the start of the vector under consideration; a second column 602 containing the identity number for the node at the end of the vector under consideration and a third column 604 containing the bit vector for that vector. Thus, it will be seen that each vector is identified by two nodes, one at each end thereof and it will be understood that in this embodiment, each node within the electronic map under consideration is given an identity number.

Some embodiments of the invention may allow users of the electronic map to highlight errors within that electronic map. In particular, it may be possible for a user to mark road segment as blocked (ie to indicate that a vector is blocked) and this would have the same effect on traffic flow as a traffic incident. As such, data representing a blocked road segment may be considered in the same manner as data detailing a traffic incident.

Alternative, or additional embodiments may allow a user may be able to indicate that a road has become unblocked, a new road has been created, or the like, any of which may be thought of as creating a new vector within the electronic map. Typically, because the routing acceleration data, as shown in FIG. 6, is generated by pre-processing such new vectors would not be considered by routing methods which utilise the routing acceleration data since the routing acceleration data would not refer to the new vectors.

A navigation device is able to utilise the routing acceleration data exemplified in FIG. 6 when it calculates a route between origin and destination nodes (ie positions). In particular, when the A* method is being processed, exploration of the electronic map is constrained to only consider a road sub network that defines roads on a lowest cost (according to a predetermined criteria) route to the destination as identified by the routing acceleration data; it having been previously determined by the pre-processing that that road segments were part of a lowest cost route to a given area containing the destination.

Figure 7:
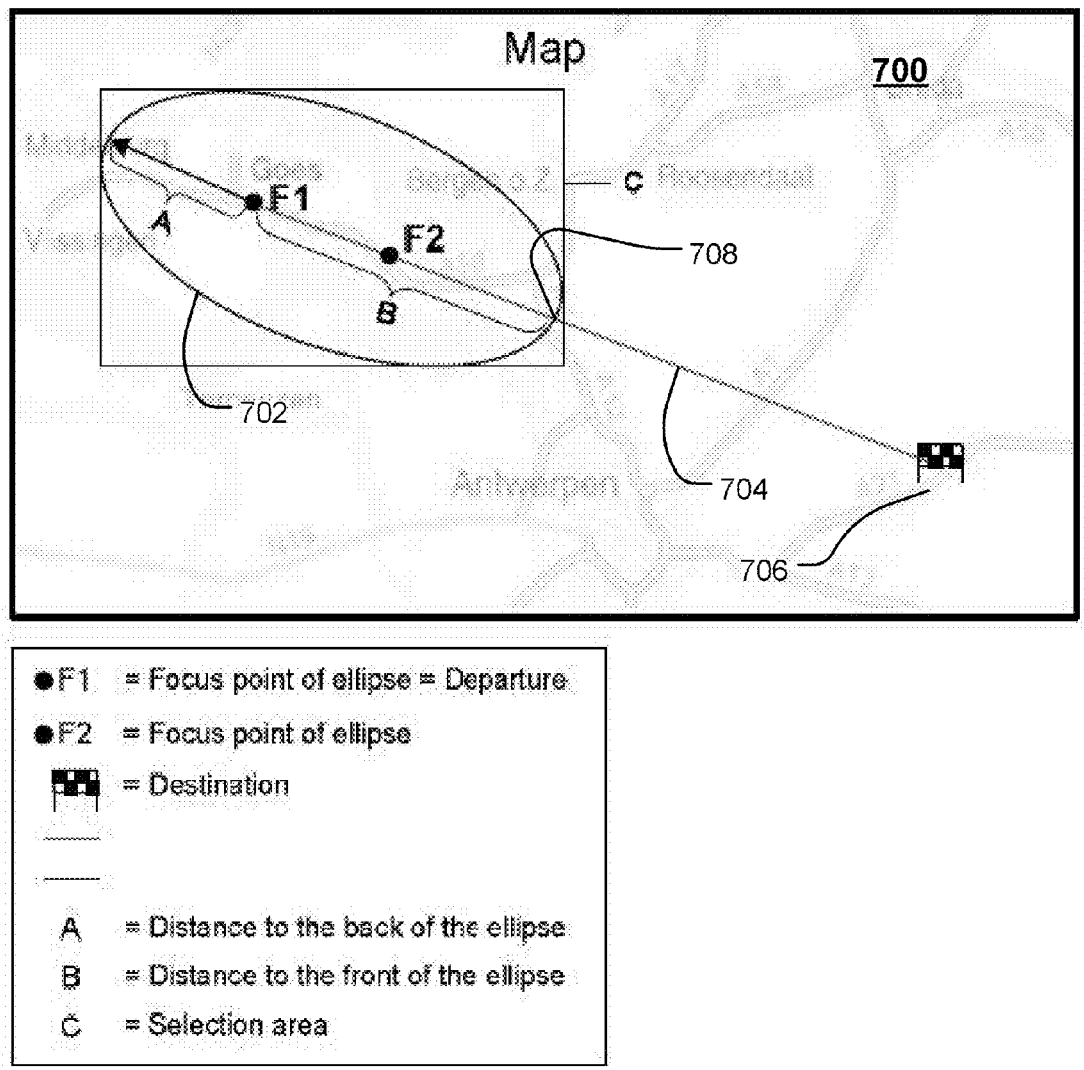
FIG. 7 illustrates a predetermined threshold from an origin position as utilised in some embodiments of the invention.

FIG. 7 exemplifies how the A* search method and the routing acceleration data exemplified in FIG. 6 are combined in an embodiment of the invention.

Figure 12:
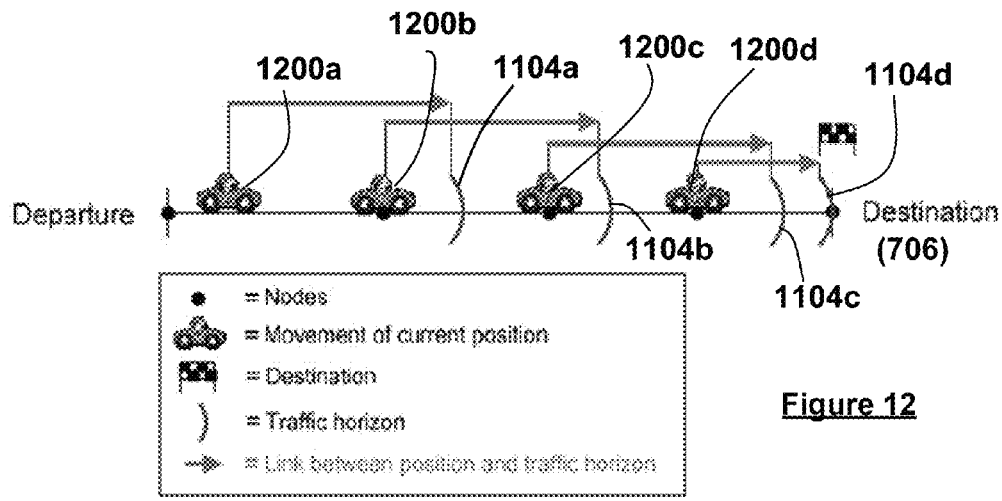
FIGS. 12 and 13 illustrate how some embodiments of the invention update the calculated route whilst driving is occurring.
Figure 13:
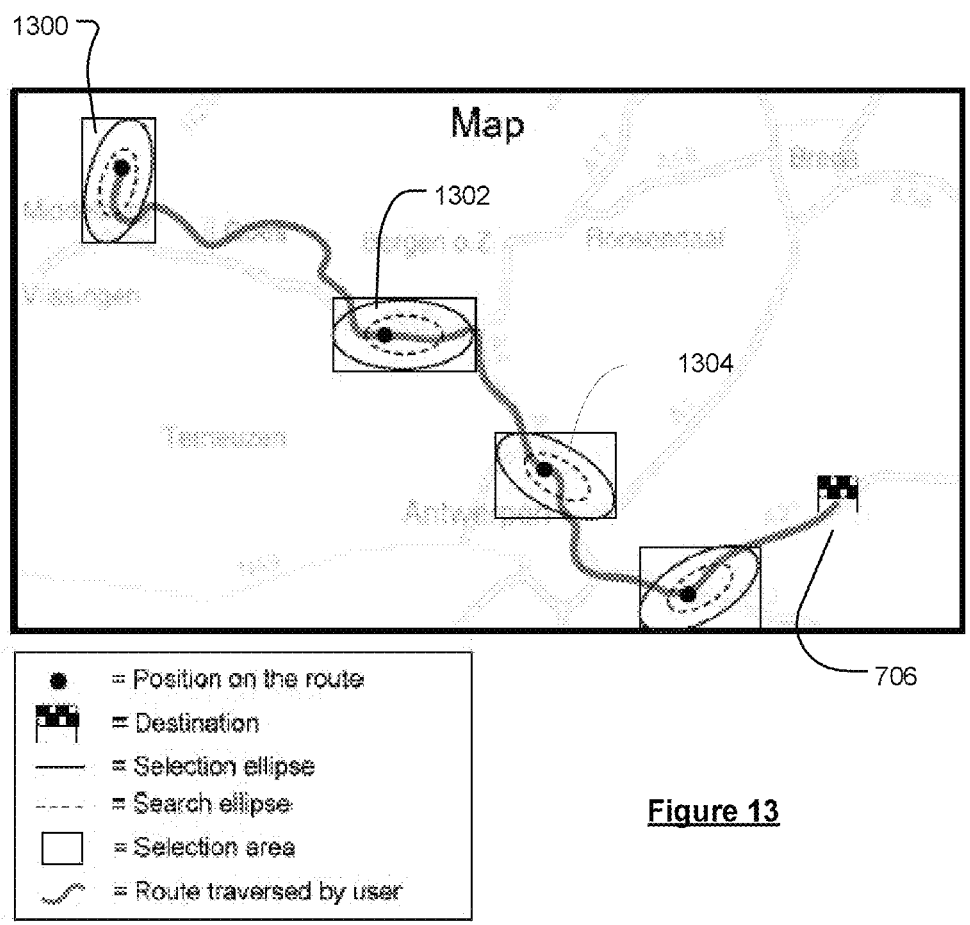
Figure 14:
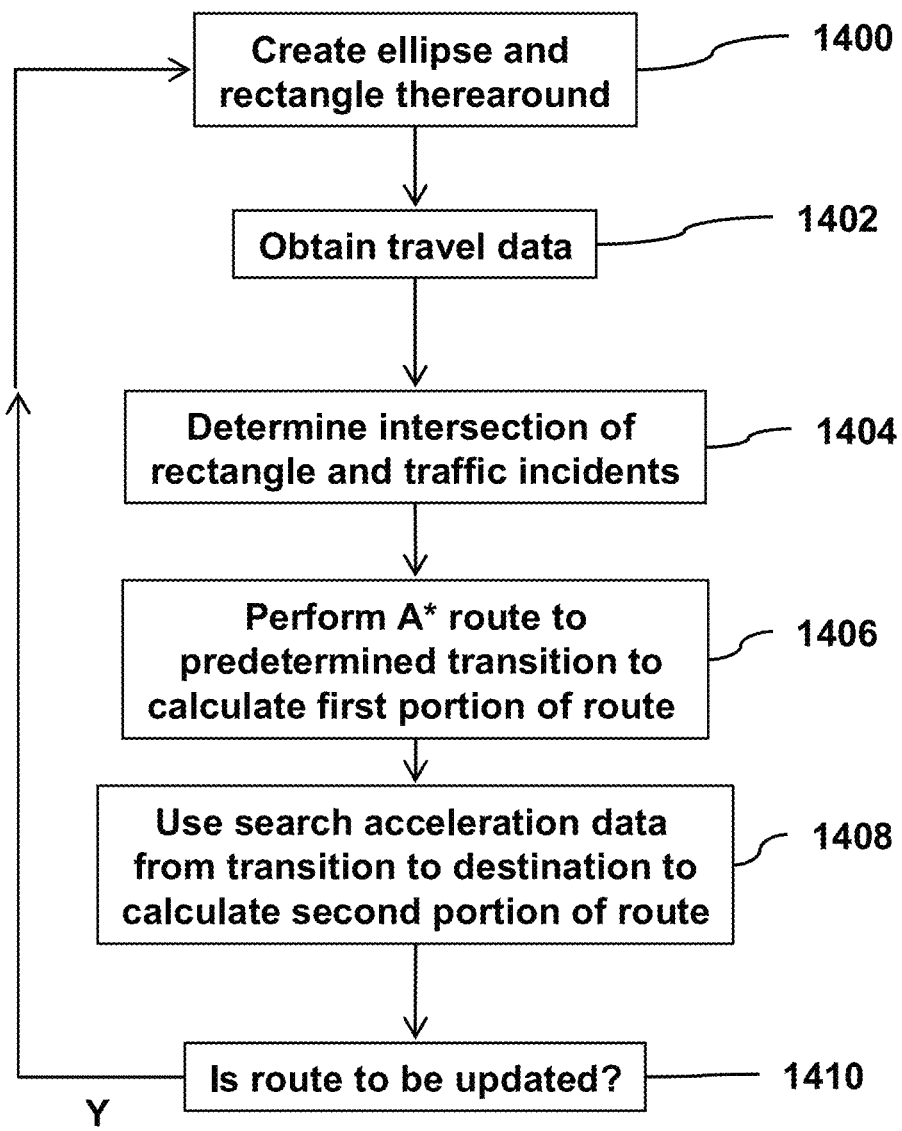
FIG. 14 shows a flow chart outlining generation of a route according to an embodiment of the invention.

FIG. 14 outlines a flowchart which outlines steps discussed in relation to FIGS. 6 to 13. The steps of the flowchart use reference numbers in the series 14xx.

It is known that traffic conditions on a road network can effect, often seriously, the time that it takes to drive along a road. As such, it is known for navigation devices to take into account delays due to traffic (including accidents, etc) when they are calculating the lowest cost route between an origin and a destination. It will be appreciated, for example, that if the criterion being used to determine the lowest cost is travel time then the route can be affected by traffic conditions.

Embodiments of the invention apply a predetermined threshold around the origin position and only consider traffic conditions within that predetermined threshold thereby reducing the processing burden of considering traffic over a wide geographic area.

Referring to FIG. 7 which shows a portion of a electronic map 700, having marked thereon a rectangle C highlighting an area in which delay data is considered and this rectangle C encloses an ellipse 702. The rectangle may be thought of as being fitted to the ellipse once the ellipse has been generated. It will be seen from the Figure that the rectangle C is arranged to be the smallest rectangle that can fit around the ellipse. The bounding rectangle may be horizontally and vertically aligned (i.e. no rotation).

The ellipse 702 is positioned such that a first focus point of the ellipse F1 is positioned at the origin position (often the start position of a vehicle for a journey) and the second focus point of the ellipse F2 is positioned on a straight line 704 between the first focus point F1 and the destination position 706. The distance from the first focus point F1 to the intersection of the ellipse 702 (ie the dimensions of the ellipse) and the line 704 (ie point 708/the boundary of the ellipse) is set to be the distance that could be traveled, at a second driving speed, in roughly 40 minutes in what may be thought of as a best case scenario. In this sense, best case scenario refers to the situation in which we can drive the fastest (no delays) and as a consequence we could travel the longest distance. For example, at a 120 km/h speed the resulting distance would be 80 km. In reality the reachable distance in 40 min will be smaller but the purpose of the bounding area is to cover all possible cases (or at least substantially all cases).

This best case scenario distance is represented by distance B on FIG. 7. The distance from the first focus point F1 to the other intersection of the ellipse 702 and the line 704 is consequently roughly 30 km (ie distance A in FIG. 7). The distance 30 km is selected to cover a city ring behind the origin position F1 that could belong to an optimal route as determined by the first routing method. Each of the 30 km and the 80 km are quoted in terms related to the electronic map with which the predetermined threshold is being used. Creation of the ellipse 702 and rectangle C is shown at step 1400.

Other embodiments of the invention may use a different distance for the distance A. For example, the distance A may be substantially any of the following distances: 10 km; 15 km; 20 km; 25 km; 35 km; 40 km; 45 km; 50 km; or the like. The selection of the distance for A may depend on the area covered by the electronic map and may be selected on a country by country basis, or the like.

Other embodiments might use other time values (such as roughly any of the following number of minutes: 10, 15, 20, 25, 30, 35, 45, 50, 60, 70, or more). However, 40 minutes has been selected because traffic problems typically have a life-span smaller than 30 minutes and the addition of a further 10 minutes to this value provides a margin of safety. As such, with the predetermined threshold set to be equivalent to a 40 min travel time traffic problems beyond the predetermined threshold are likely to have gone away before a vehicle reaches the incident and as such can safely be ignored from the routing from the origin position F1 to the destination position 706.

Some embodiments of the invention may be set to treat road closures in a different manner since these typically do not introduce any delay but are rather road stretches to be avoided completely in the search process. As such, some embodiments of the invention may remove such closed roads from consideration.

Figure 8:
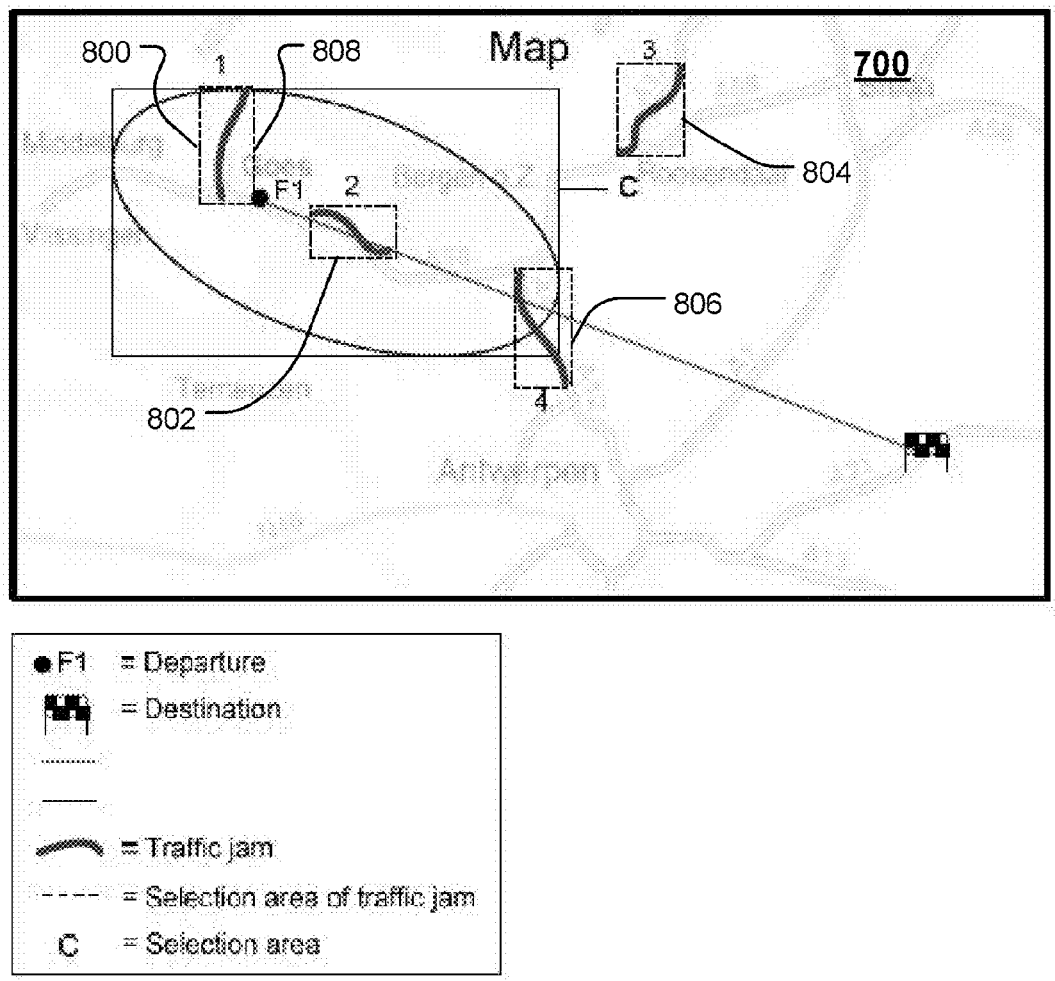
FIG. 8 illustrates how delay data is utilised in some embodiments of the invention.

Delay data is obtained (step 1402) from a known source (i.e. for example processed data from a traffic info server) and the next step of embodiments of the invention is to utilise the delay data with a predetermined threshold described below and this is described further with reference to FIG. 8. Typically the delay data provides information on delays caused by traffic incidents (ie traffic jams and the like) but delay data may, in some embodiments, provide information on delays arising from any reason on vectors of the electronic map. A delay may be thought of as a reduction in the average speed along that vector, perhaps compared to the best-case driving conditions discussed above. Driving speed, for a best-case scenario, for a given vector may be held within the electronic map.

In the example being given, four traffic jams 800,802, 804,806 exist within the area covered by the electronic map 700. A bounding rectangle (eg 808) is placed around the traffic incident which is typically the smallest rectangle which can contain all the affected road segments that are related to the corresponding traffic incident. As discussed above, the term traffic incident is also intended to include road segments (ie vectors) which have been marked as blocked by a user of the electronic map (whether that be the user of a particular navigation device or another user which has been identified by a technology such as Map Share™). A traffic incident may cover partially or completely a given road line.

Next the method determines (step 1404) whether there is an intersection between any of the bounding rectangles 808 associated with a traffic jam 800-806 and the area covered by the rectangle C (for which delay data is obtained). If there is an intersection then the intersected traffic incident is taken into consideration for routing on the journey from the first focus of the ellipse F1 to the destination position 706. Thus, in the example of FIG. 8 traffic jams 800, 802 and 806 are all considered since these intersect with the rectangle c whereas traffic jam 804 is not considered since it falls beyond the extent of the rectangle c.

Once the traffic which should be considered has been identified, the method can proceed to calculate a route from the origin position (ie the focus F1 of the ellipse) to toward destination position 706 and this calculation is based upon driving time.

Thus, an A* search is initiated from the origin position F1 and the driving time is tracked. The use of the A* search utilises a first routing method which is used up to a predetermined threshold and this first routing method takes into account delays provided by the delay data. Once the total driving time to a point has reached 40 minutes (ie the predetermined threshold) then the A* methodology is no longer solely used and the routing acceleration data described in relation to FIG. 6 is also used. Thus, the transition from the first routing method to a second routing method occurs at a distance that can be traveled within a predetermined driving time. The A* search is represented at step 1406.

Because the transition from A* methodology to include routing acceleration data is based upon driving time, which is in turn influenced by driving conditions, then there is no fixed distance from the origin position F1 for the transition to occur. This distance can be represented by an ellipse 900 as shown in FIG. 9 which it will be seen is less, perhaps significantly, than the distance set by the rectangle C discussed above since the rectangle C was set utilising best-case driving conditions.

Figure 9:
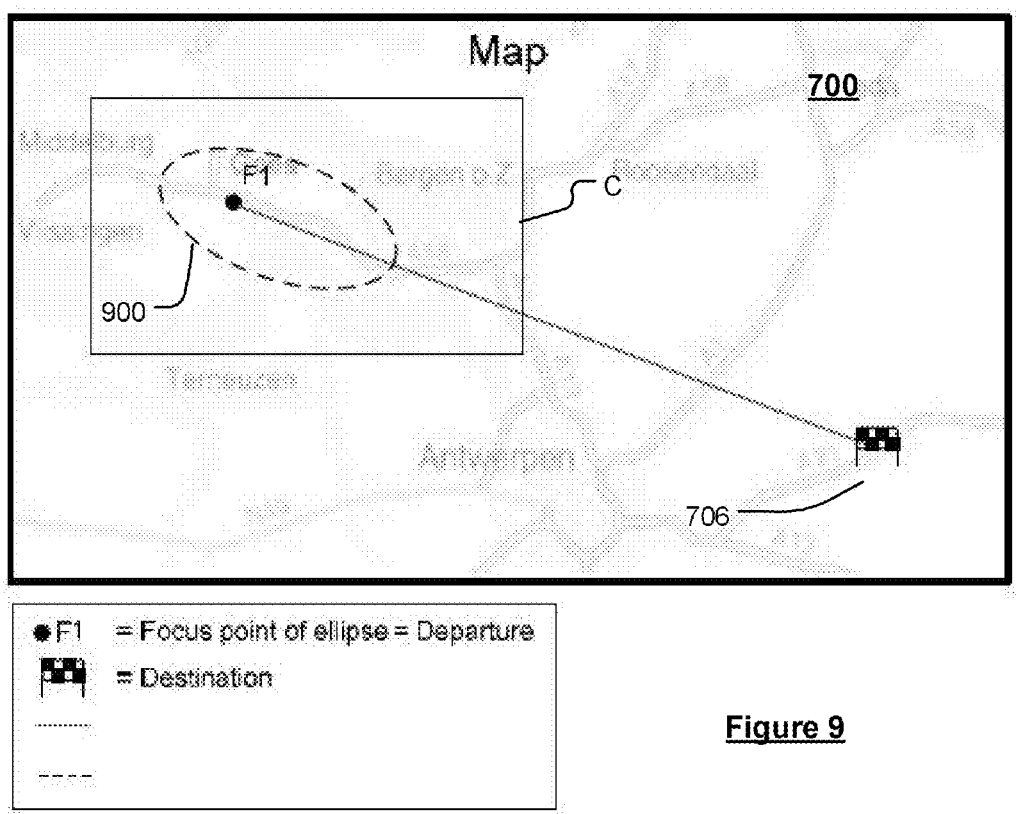
FIG. 9 illustrates how the predetermined threshold may be varied in some embodiments of the invention.

As such, the ellipse 900 in FIG. 9 is the actual reachable search area within the given 40 min in a real situation while the larger rectangle C is the bounding rectangle of the ellipse assuming no delay (max possible speed values considered); ie the area for which delay data is obtained. During this time the vehicle is assumed to be travelling at a first speed which is less than the second speed discussed above.

Thus, the rectangle C is used to select the traffic incidents of relevance and should cover the best case, or in other words the largest possible area when there is no delay. The ellipse 900 is used to set the transition from A* routing to routing using the search acceleration data.

The skilled person will appreciate that the first and/or second driving speeds need not be fixed for a route and will typically vary from vector to vector along a route.

The transition between the A* methodology to use of acceleration data occurs at what may be thought of as a traffic horizon; ie an horizon beyond which traffic is no longer considered (represented by step 1408).

As discussed above, it is possible for a user (whether that be the user of a particular navigation device or another user which has been identified by a technology such as Map Share™) to indicate that there are new vectors within the electronic map (ie a vector which was not previously part of the electronic map). However, because the routing acceleration data is generated by pre-processing those new vectors would not be considered by the second routing method in the generation of the second portion of the route 1004. As such, embodiments of the invention which allow new vectors to be added to the electronic map may amend the routing acceleration data to reflect that the new vector is part of the lowest cost route as indicated by the routing acceleration data to each region of the map. That is the row for the, or each, new vector would be set so that all of the bits for that vector would be set to '1' indicating that the vector was part of the lowest cost route to each region of the electronic map. The skilled person will appreciate that this is not actually the case but will also appreciate that setting the bits in this manner will cause the second routing method to consider the new vector when it generates the second portion of the route 1004.

The skilled person will appreciate that the method of setting the bits of the bit vector representing the new vector to '1' is applicable to any method which utilises the rouging acceleration data and not simply embodiments which utilise the second routing method after a predetermined threshold. For example, it is of course possible to generate a route between an origin position and a destination position utilising the search acceleration data for substantially the entire route.

Figure 10:
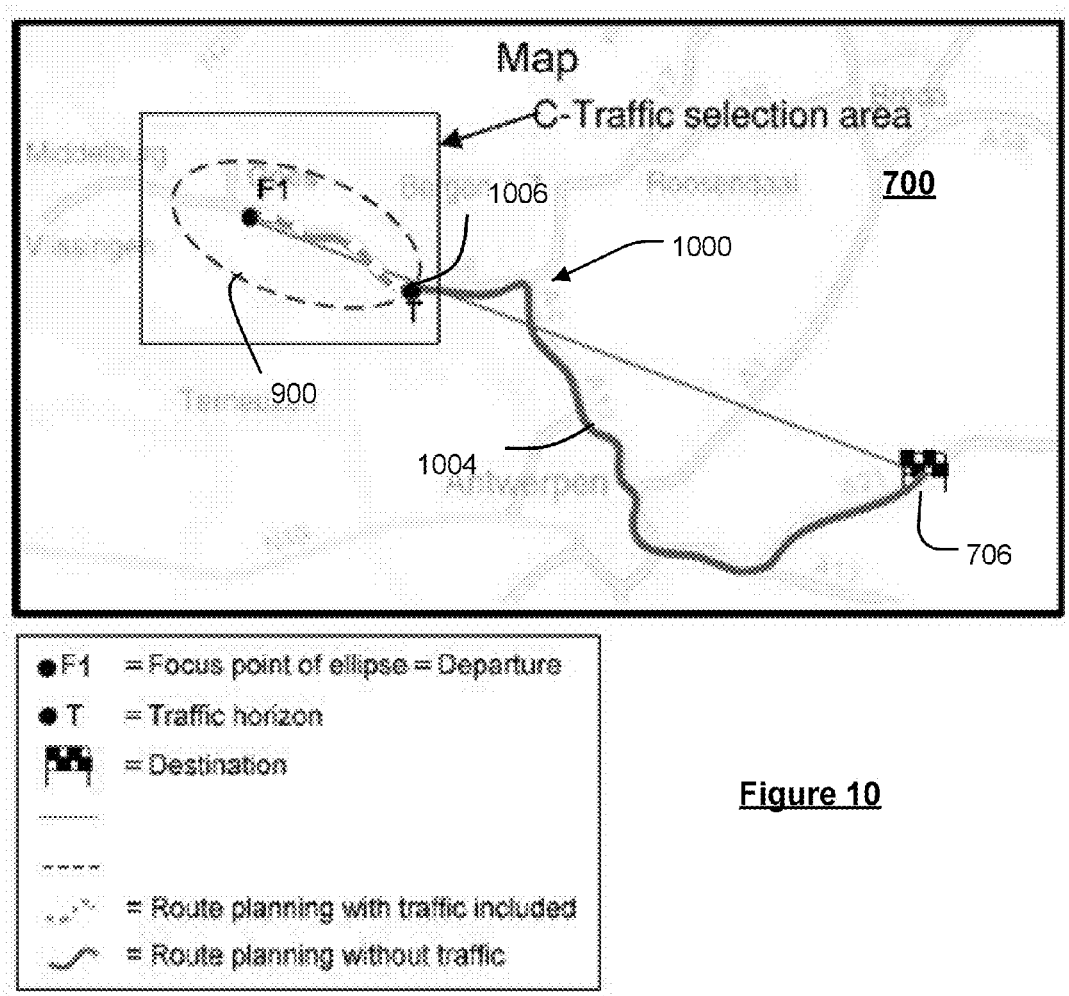
FIG. 10 illustrates how embodiments of the invention may switch between a first routing technique and a second routing technique.

FIG. 10 shows a route 1000 which has been plotted from the origin position F1 to the destination position 706. It can be seen from the nature of the line (ie dashed vs non-dashed) whether the route has been generated considering traffic (ie the dashed line which may be thought of as a first portion 1002 of the route) vs generated without considering traffic using the acceleration data (ie the non-dashed line which may be thought of as a second portion 1004 of the route). It will be seen that the transition between no-traffic and traffic occurs at the intersection 1006 T of the route with the ellipse 900. The transition (1006/T) may be termed a traffic horizon.

Figure 11:
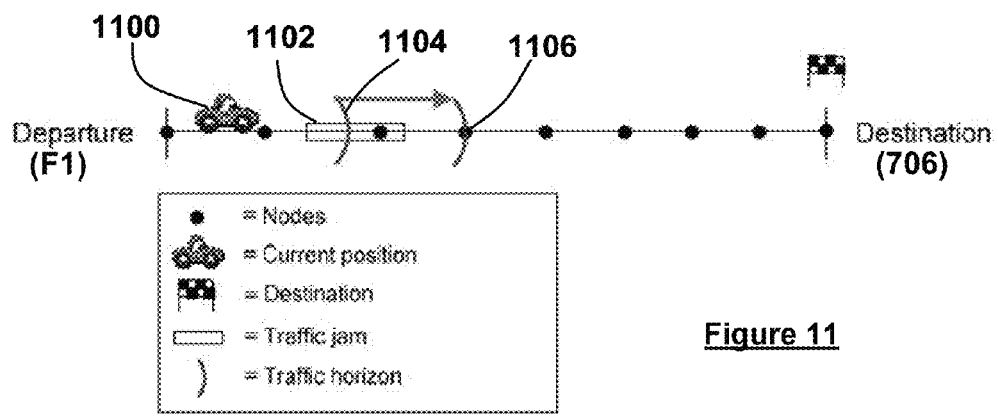
FIG. 11 illustrates how some embodiments may illustrate the existence of traffic incidents.

FIG. 11 shows an example of a display which may be made upon the display screen 206 of the navigation device 200 situated within a vehicle 1100. The skilled person will appreciate from the above that the delays due to traffic (which are exemplified by the rectangle 1102) will only be shown up to the traffic horizon 1104.

In some embodiments, if the traffic horizon 1104 intersects with a traffic incident 1102, as is the case in FIG. 11, then the traffic horizon 1104 may be extended out to the next electronic map node beyond the end of the traffic incident 1102; ie node 1106.

Some embodiments of the invention may use electronic maps which have speed data associated with vectors thereof. In particular, some embodiments may use electronic maps having time dependent speed data associated with the vectors thereof. That is, it will be appreciated that the average speed along a gives section of road (as represented by a vector in the electronic map) will varying according to the time of day; for example rush hour traffic is much slower than at 3 am in the morning.

Thus, the actual travel time (A) for a journey can be given by the following equation:

$$A=F+T+I$$

where
F=Free Flow Travel Time—time to make the journey in optimal travel conditions.
T=Travel Delays—sum of all traffic delays (not that the traffic delay on a particular road is defined as (time to travel the road given the incident) minus (time to travel the road under free flow conditions).
I=Sum of all delays due to time dependent speed data delays which is defined as (time to travel the road given the time dependent speed data) minus (time to travel the route under free flow speed).

In embodiments of the invention, T in the above equation will only include traffic delays up to the traffic horizon 1104; ie the transition point between A* routing and routing using the routing acceleration data.

In some embodiments, the speed data associated with vectors of the electronic map may comprise measured speed values for the road segment represented by the vector. As such, such measured speed data provides what may be thought of as historical delays which will be considered for vectors of the route for which such speed data is available (which may typically be substantially all vectors) unless traffic data (ie delay data) is available for a given vector.

The navigation device 200, as is known in the art, allows a user to display a route summary on the display screen 206. Some embodiments of the invention may allow a user to see the traffic delays (ie traffic incidents) within this list. Typically the traffic delays in this list are displayed up to the traffic horizon 1104. However, the skilled person will appreciate that stopping the display of the traffic delays at the traffic horizon 1104 is an implementation choice and other embodiments may list traffic delays beyond the traffic horizon 1104.

Alternatively, or additionally embodiments may provide a display, such as an incident display, which allows traffic delays/incidents to be viewed. Such a view may show all of the incidents of which the navigation device 200 is aware rather than just those up to the traffic horizon 1104. Again, other embodiments may simply list traffic delays up to the traffic horizon 1104.

FIGS. 12 and 13 show how the traffic horizon 1104 may be re-evaluated as a vehicle 1200 drives (ie traverses). FIG. 12 shows that as the vehicle moves from position 1200*a*, through the positions 1200*b* and 1200*c*, to the position 1200*d* (ie the destination (706) that the horizon respectively exists at positions 1104*a*, 1104*b*, 1104*c* and 1104*d*.

Some embodiments of the invention do not make this re-evaluation on a continuous basis (although this would be possible whilst being processor intensive) but update the traffic horizon when the vehicle 1200 moves beyond a node within the route along which the vehicle is being directed. Thus, it will be seen that in FIG. 12 a node is shown at vehicle positions 1200*a*, 1200*b*, 1200*c* and 1200*d* to signify the re-calculation of the traffic horizon 1104 as the vehicle moves beyond that node.

Moreover, it will be appreciated that traffic incidents change on a continuous basis and as such, the traffic incidents are likely to come and go as the vehicle moves between the positions 1200*a* and 1200*d*. As such, traffic updates may be received whilst the vehicle is moving toward the destination 706 (ie position 1200*d*). Some embodiments of the invention may be arranged to update the route using traffic updates, may be when the traffic update is received.

Thus, on the arrival of a traffic update then a route may be re-planned. The skilled person will appreciate that a route may be re-planned for a number of other reasons (for example deviation from a route, user change, etc). However, whatever the reason for the cause of the update, some embodiments of the invention are arranged to recalculate the ellipse 702 described above such that the focus F1 is based at the current position of the vehicle. This is as shown in FIG. 13 where it is seen that 4 recalculations 1300, 1302, 1304 and 1306 can be seen. It will be seen that the flow chart shown in FIG. 14 loops back to the beginning if the route is to be recalculated (step 1410).

The invention claimed is:

1. A computerised method of generating a route from an origin position to a destination position across an electronic map comprising a plurality of vectors representing segments of a navigable route in an area covered by the electronic map, the method comprising:
obtaining delay data indicating delays on vectors within an area covered by the electronic map;
calculating a first portion of a route, from an origin position toward the destination position, using a first routing method up to a predetermined threshold from the origin position, such that the first routing method uses the delay data so that the first portion of the route takes into account delays;
calculating a second portion of the route beyond the predetermined threshold to the destination position using a second routing method to further calculate the route to the destination position, wherein the second routing method uses routing acceleration data which indicates vectors within the electronic map which form part of a lowest cost route according to a predetermined cost function; and
providing instructions to navigate the route based on the calculated first and second portions of the route.

2. The method according to claim 1 wherein the second routing method does not use delay data.

3. The method according to claim 1 comprising setting the predetermined threshold up to which delay data is considered at the distance that can be traveled within a predetermined driving time.

4. The method according to claim 1 comprising using a predetermined shape to determine the area in which the delay data is obtained.

5. The method according to claim 4 wherein the predetermined shape is an ellipse, and wherein the origin position is at a first focus of the ellipse.

6. The method according to claim 5 comprising arranging the dimensions of the ellipse such that the distance from the first focus, through the second focus, to the boundary of the ellipse is equal in distance to the distance that a vehicle could travel within a predetermined driving time.

7. The method according to claim 4 comprising subsequently fitting a shape that can be tessellated around the predetermined shape.

8. The method according to claim 7 wherein the shape that can be tessellated is a rectangle.

9. The method according to claim 7 comprising forming a shape around areas covered by delays, and subsequently determining whether the shape around a delay intersects the shape formed around the predetermined shape, and utilising delay data relating to any incident in which an intersection occurs.

10. The method according to claim 1 wherein an A * method is used as the first routing method.

11. The method according to claim 1 comprising recalculating the route if parameters used to generate the original route should change.

12. A navigation device which is arranged to generate a route from an origin position to a destination position across an electronic map accessible thereby and comprising a plurality of vectors representing segments of a navigable route in an area covered by the electronic map wherein the device is arranged to:
obtain delay data indicating delays on vectors within an area covered by the electronic map;
calculate a first portion of a route from the origin position toward the destination position using a first routing method up to a predetermined threshold from the origin position wherein the first routing method uses the delay data so that the first portion of the route takes into account delays identified by the delay data; and
calculate a second portion of the route beyond the predetermined threshold to the destination position using a second routing method to further calculate the route to the destination position, wherein the second routing method uses routing acceleration data which indicates vectors within the electronic map which form part of a lowest cost route according to a predetermined cost function.

13. A navigation device according to claim 12 which is a Portable Navigation Device (PND).

14. A navigation device according to claim 12 in which the second routing method does not use delay data, wherein the method may set the predetermined threshold up to which delay data is considered at the distance that can be traveled within a predetermined driving time.

15. The navigation device according to claim 12 wherein the second routing method does not use delay data.

16. The navigation device according to claim 12 wherein the device is arranged to set the predetermined threshold up to which delay data is considered at the distance that can be traveled within a predetermined driving time.

17. A system arranged to generate a route from an origin position to a destination position across an electronic map comprising a plurality of vectors representing segments of a navigable route in the area covered by the electronic map, wherein the system comprises:
at least one server arranged to generate delay data indicating delays on vectors within the area covered by the electronic map; and
at least one navigation device according to claim 12 arranged to receive the delay data for an area covered by the map.

18. A non-transitory machine readable medium containing instructions which when read onto at least one machine cause that machine to perform the method according to claim 1.

19. The navigation device of claim 12 wherein each of the of vectors is a bit vector.

20. The navigation device of claim 12 wherein each of the plurality of vectors is pre-processed.

21. The navigation device of claim 12 wherein the area covered by the electronic map is divided into a plurality of regions and the routing acceleration data indicates vectors within each region whether the vector forms part of a lowest cost route to any other regions.

* * * * *